(No Model.)
W. O. SILVEY.
PORTABLE OVEN.
No. 475,161.  Patented May 17, 1892.
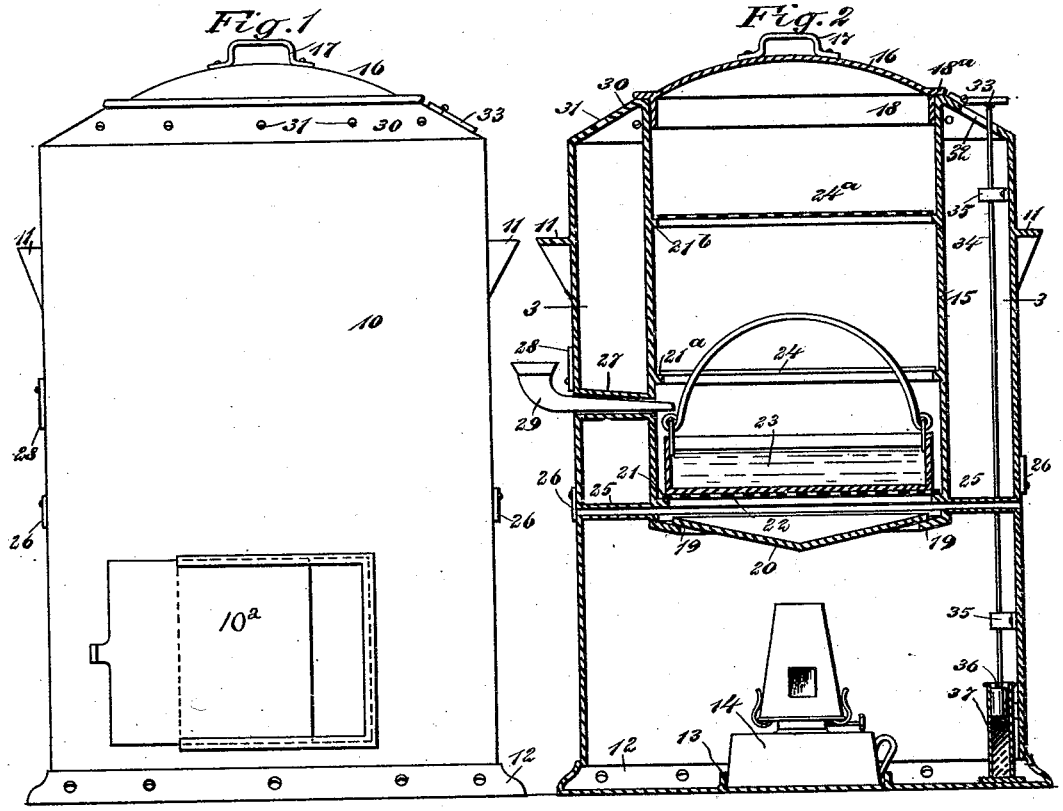
WITNESSES:
J. A. Bergstrom
C. Sedgwick
INVENTOR:
W. O. Silvey
BY Munn & Co.
ATTORNEYS

UNITED STATES PATENT OFFICE.

WILLIAM O. SILVEY, OF MIDDLEPORT, OHIO.

PORTABLE OVEN.

SPECIFICATION forming part of Letters Patent No. 475,161, dated May 17, 1892.

Application filed December 18, 1891. Serial No. 415,500. (No model.)

*To all whom it may concern:*

Be it known that I, WILLIAM O. SILVEY, of Middleport, in the county of Meigs and State of Ohio, have invented a new and Improved Portable Oven, of which the following is a full, clear, and exact description.

My invention relates to improvements in portable ovens; and the object of my invention is to produce a simple, durable, and cheap oven which may be heated by an ordinary lamp burning oil or gasoline, which is especially adapted for raising any kind of bread, bread-sponge, or similar material, which may also be used for keeping any articles warm, which is provided with means for heating the inner chamber either by steam or hot air, which may be kept warm for a long time, and which has thermostatic means for regulating the amount of heat so as to maintain the exact temperature desired.

To this end my invention consists in a portable oven, the construction of which will be hereinafter described and claimed.

Reference is to be had to the accompanying drawings, forming a part of this specification, in which similar figures of reference indicate corresponding parts in all the views.

Figure 1 is a front elevation of the oven embodying my invention. Fig. 2 is a vertical cross-section of the same on the line 2 2 in Fig. 3, and Fig. 3 is a sectional plan on the line 3 3 in Fig. 2.

The oven may be made in any desired shape, but is preferably cylindrical or square, and in the drawings it is shown as cylindrical. The outer shell 10 of the oven is provided with a door $10^a$ near its base, and near the top and on opposite sides with ears 11, which serve as handles, and with a perforated base 12, upon which it rests and the perforations of which admit air to the oven so as to promote combustion in the lamp.

Within the oven and on the bottom thereof is a socket 13, which is adapted to receive and hold securely the lamp 14, which may be of the usual form, having the common metallic chimney, with isinglass or mica therein through which the flame may be seen. Above the lamp is an inner chamber 15, in which the bread to be raised or the other articles to be kept warm are placed, and this chamber conforms in shape to the shape of the outer wall, and at its top it is closed by a removable cover 16, having a handle 17, and having flanges 18 and $18^a$, which fit snugly within and upon the top of the oven, and thus prevent any waste of heat.

The chamber 15 is open at the bottom, but may be closed by a plate 20, which is preferably convex on the under side, and which rests on a flange 19 at the bottom of the oven. This plate is used when the oven is to be heated by hot air alone and serves as a deflector to prevent too much heat from passing directly into the chamber 15. Above the flange 19 is a similar flange 21, adapted to support a perforated shelf 22, on which a pan 23 may be placed, which pan is adapted to contain water, and the heat of the oven will convert the water to steam, so that the air in the oven may have the requisite moisture. Above the pan are flanges $21^a$ and $21^b$, which are secured to the inner wall of the chamber 15, and which are adapted to support shelves 24 and $24^a$, one or both of which may be perforated, as shown in the drawings, and it will be understood that the oven may be made of any desired height and a greater or less number of shelves or of pans may be placed therein.

On opposite sides of the chamber 15 and near the bottom thereof are pipes 25, which open into the chamber from outside the oven and supply the chamber with fresh air. The entrances to these pipes may be closed by doors 26, which are pivoted on the outer wall of the oven. A pipe 27 extends through both walls of the oven at a point a little above the pan 23, and this pipe may be closed by a door 28, pivoted on the outer wall of the oven, and the object of the pipe is to permit the insertion of a curved funnel 29, which delivers into the pan 23, and consequently water may be placed in the pan by simply pouring it into the funnel, thus obviating the necessity of removing the pan. The space between the inner and outer walls is closed at the top, as shown at 30, and in this top portion are small perforations 31, which provide for the escape of surplus steam and gas, and on one side of the oven and in this top is a large opening 32, which is closed by a door 33, which has a rod 34, secured to its under side, and the rod extends vertically downward into the oven, being held to slide in keepers 35, secured to the oven-wall, and the lower end of the rod terminates in a piston 36, which is mounted upon a body of mercury held in the cylinder 37, which is secured to the bottom of the oven.

The rod and mercury column are adjusted so that when the temperature of the oven rises above a certain point the rise of mercury in the column will raise the piston and the door 33, thus permitting the escape of heat and lowering the temperature of the oven, and when the temperature falls below a certain point the mercury will drop, thus permitting the piston 36 and door 33 to drop, also, and the temperature of the oven will rise. It will thus be seen that the mechanism just described operates as a thermostat to regulate the temperature of the oven.

When the oven is used, the lamp 14 is lighted, and if hot moist air is required the plate 20 is removed and the pan 23 inserted, the bread to be raised and the articles to be kept warm being placed above the pan on one of the shelves 24 and 24$^a$. If, however, hot dry air is required, the pan 23 is removed and the plate 20 inserted, which plate causes the rising heat to be distributed around the chamber 15, so as to evenly heat the chamber.

Having thus fully described my invention, I claim as new and desire to secure by Letters Patent—

1. The combination, with the outer shell or casing having a concentric chamber in its upper portion, an annular chamber separating the two, and a cover for the upper end of the inner chamber, of plates or partitions in the lower end of the inner chamber, cold-air tubes leading therein, and a heater in the lower part of the main shell or casing beneath the bottom of the inner chamber, substantially as set forth.

2. The combination, with the outer shell or casing having a depending concentric open-ended chamber 15, provided with a cover, an annular chamber being formed between the two, having openings in its top and at its lower end opening into the lower half of the main shell or casing, of the removable deflector 20, closing the lower end of chamber 15, the apertured plate thereabove, the water-vessel on said plate, air-tubes leading between the deflector and apertured plate, a water-funnel to supply said vessel, and a heater under the said deflector, substantially as set forth.

WILLIAM O. SILVEY.

Witnesses:
W. B. PETES,
JAMES H. RALSTON.